April 14, 1970 B. GARLAND 3,506,784

TRANSISTOR FSK SWITCHING CIRCUITS

Filed Feb. 3, 1967

INVENTOR
BERNARD GARLAND
BY
[signature]
ATTORNEYS

United States Patent Office 3,506,784
Patented Apr. 14, 1970

3,506,784
TRANSISTOR FSK SWITCHING CIRCUITS

Bernard Garland, Balsall Common, Coventry, England, assignor to The General Electric Company Limited, London, England, a British company Filed Feb. 3, 1967, Ser. No. 613,848
Claims priority, application Great Britain, Feb. 4, 1966, 5,019/66
Int. Cl. H03c *3/10;* H04l *27/12*
U.S. Cl. 178—66 2 Claims

ABSTRACT OF THE DISCLOSURE

In a frequency shift data transmitter which is responsive to pulse signals of alternate polarities to generate respective oscillatory output signals of two different frequencies, a transistor is used selectively to switch a capacitor in circuit with the tuned circuit of the oscillation generator, and a forward biased diode is employed to set the forward bias level for the transistor so as to avoid distortion of received pulses whose transients are not effectively instantaneous.

The present invention relates to electric switching circuits.

In particular but not exclusively the invention relates to electric switching circuits for use in telegraphy apparatus employing double current signalling. Ideally the transitions in a double current signal between one signalling condition and the other occur instantaneously, so that the signal exhibits a generally rectangular voltage waveform, but after transmission from one point to another the waveform becomes distorted and the transitions less well defined.

If a telegraph signal which has been distorted in this manner is applied to a switching circuit which operates between its two conditions when the input voltage applied thereto passes a value other than zero, that is if the switching element requires a certain minimum value of forward bias before it will operate, then the waveform distortion gives rise at the switching circuit to output pulses of one polarity being of increased duration and of the other polarity being of decreased duration with respect to the original signal pulses.

It is an object of the present invention to provide a switching circuit in which the above disadvantage is substantially overcome.

According to the present invention an electric switching circuit which is adapted to respond to electric pulse signals comprises a transistor having a control electrode and first and second further electrodes, which further electrodes are arranged to be connected in circuit with a utilisation device, a potential divider network comprising a rectifier element and a first resistor connected in that order between a point of reference potential and a source of potential different from said reference potential, direct current means including a further resistor connecting said rectifier element between said control electrode and said first further electrode of said transistor, and an input path connected to said first further electrode, in operation of the switching circuit current-flow through said rectifier element from said source of potential by way of said first resistor giving rise to a potential difference between said control electrode of said transistor and said point of reference potential such that when an input voltage signal applied to said input path has one polarity said transistor presents substantially a low impedance to said utilisation device between said further electrodes and when said input voltage signal has the opposite polarity said transistor presents substantially a high impedance to said utilisation device.

Preferably said utilisation device forms part of an oscillation generator in a frequency shift telegraphy transmitter in which a reactive element is selectively connected in circuit with a frequency-determining network in said oscillation generator or effectively disconnected from said network in dependence upon the impedance presented by said transistor between said further electrodes.

A frequency shift telegraph transmitter circuit including an electric switching circuit in accordance with the present invention will now be described by way of example with reference to the accompanying drawing, in which.

Figure 1:
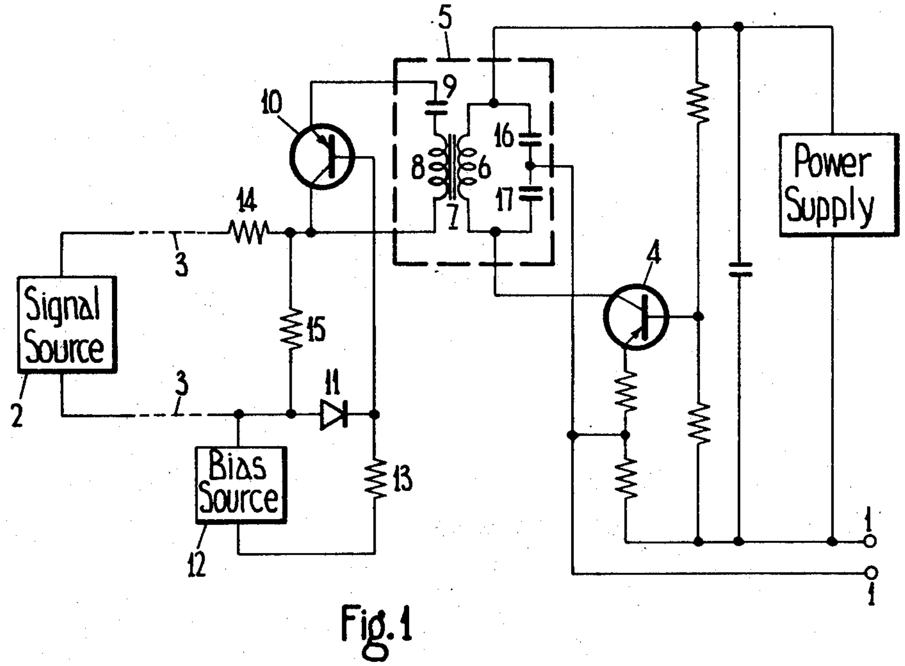
FIGURE 1 shows the telegraph transmitter circuit diagrammatically.

Referring to FIGURE 1, the transmitter is arranged in operation to transmit over a two-conductor output path 1 signals at one or other of two discrete frequencies in dependence upon the instantaneous polarity of double current telegraph signals received from a signal source 2 over a two-conductor input path 3. The transmitter comprises an oscillator including a transistor 4 having connected in its collector circuit a parallel-resonant circuit 5 the inductive element of which is provided by one winding 6 of a transformer 7. Across the other winding 8 of this transformer there is connected, in series with a capacitive element 9, the emitter-collector path of a silicon junction transistor 10. Of the two conductors of the input path 3 one is connected to the anode of a silicon junction diode 11 the cathode of which is connected to the base electrode of the transistor 10 and to a negative bias source 12 by way of a resistor 13, while the second conductor is connected to the collector electrode of the transistor 10 by way of a resistor 14. A resistor 15 is connected between the anode of the diode 11 and the collector electrode of the transistor 10 forming, with the resistor 14, a potential divider network connected between the conductors of the input path 3.

In operation current flow from the negative bias source 12 through the resistor 13 and the cathode-to-anode path of the diode 11 maintains a voltage across the diode 11 of approximately six-tenths of a volt. In the absence of any signalling potential between the conductors of the input path 3 this voltage, applied between the base and collector electrodes of the transistor 10 by way of the resistor 15, is sufficient to forward bias the transistor 10 to the threshold of conduction, such that any additional forward bias, developed across the resistor 15 say, would cause the emitter-collector path of the transistor 10 to become fully conducting, while any reverse bias would ensure that the emitter-collector path of the transistor 10 would be effectively non-conducting.

One conductor of the input path 3 is maintained at approximately earth potential or "telegraph earth," while the other carries signal voltages of plus or minus eighty volts with respect to the potential of the first conductor. The values of the resistors 14 and 15 are such that in response to these signal voltages, there are developed across the resistor 15 voltages of approximately plus or minus fourteen volts, whereby the emitter-collector path of the transistor 10 is held fully conducting or non-conducting respectively.

When the emitter-collector path of the transistor 10 is fully conducting the capacitive element 9 is effectively connected across the winding 8 of the transformer 7, so that this capacitive element 9 is effectively coupled in parallel with the remaining elements 6, 16 and 17 of the parallel tuned circuit 5 of the oscillator. In this condition the oscillator generates a signal of a first frequency.

When the emitter-collector path of the transistor 10 is non-conducting the capacitive element 9 is effectively disconnected from across the winding 8 of the transformer 7, whereupon the oscillator generates a signal at a second frequency higher than the first frequency.

Figure 2:
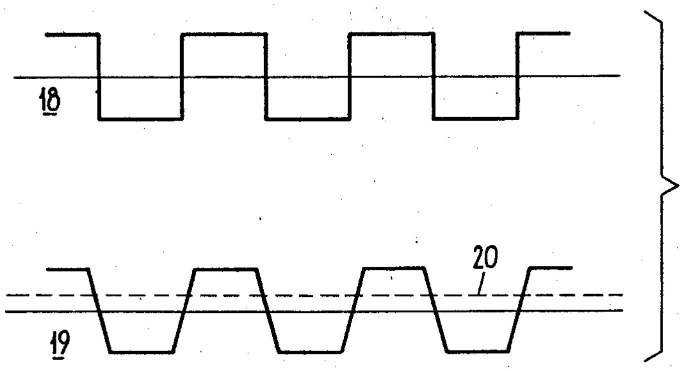
FIGURE 2 shows voltage waveforms illustrating the operation of part of the circuit of FIGURE 1.

Referring also to FIGURE 2 the telegraph signals on the input path 3 are ideally of rectangular waveform, as represented at 18, the transitions between levels being instantaneous. However, as the signals pass along the path 3 the waveform becomes distorted and the transitions between levels take a finite time, as represented at 19. The transistor 10 requires a certain minimum value of forward base bias, indicated by the dotted line 20, of about six-tenths of a volt before appreciable conduction occurs, and in order to avoid pulse length distortion a standing forward bias of this value is provided in the form of the voltage developed across the diode 11.

If the ambient temperature for the transistor 10 changes the forward bias voltage required to set the transistor 10 at the threshold of conduction also changes. However, the diode 11 and the transistor 10 are both of silicon and are subjected to the same variations in ambient temperature, and since the diode 11 is itself maintained substantially on the threshold of conduction by current flowing from said bias source 12 the bias voltage developed across the diode 11 has automatically the required temperature dependence to maintain the transistor 10 at the threshold of conduction.

I claim:

1. A frequency-shift data transmitter circuit arrangement comprising a transformer, a capacitive network, means connecting said capacitive network across one winding of the transformer to form a resonant circuit, a transistor amplifier, means interconnecting said resonant circuit and said amplifier to form as oscillation generator the oscillation frequency of which is determined by said resonant circuit, a further capacitor, means including a transistor switching element having a control electrode and two main electrodes selectively to connect said further capacitor across another winding of the transformer so as to alter the resonant frequency of said resonant circuit, a source of pulse signals, a resistive network connected across said source, a semiconductor diode, substantially constant current means connected to forward bias said diode, and means to connect at least an element of said resistive network in series with said diode between the control electrode of said transistor switching element and one of said main electrodes.

2. A frequency-shift data transmitter circuit arrangement in accordance with claim 1 wherein said transistor switching element and said diode are silicon devices.

References Cited

UNITED STATES PATENTS

| | | | |
|---|---|---|---|
| 2,802,071 | 8/1957 | Lin | 307—296 X |
| 2,930,991 | 3/1960 | Edwards | 331—117 |
| 3,295,070 | 12/1966 | Tewksbury et al. | 331—179 |
| 3,386,051 | 5/1968 | Widl | 331—179 |

ROBERT L. GRIFFIN, Primary Examiner

B. V. SAFOUREK, Assistant Examiner

U.S. Cl. X.R.

325—163; 331—117, 179